United States Patent
Vaysse et al.

(10) Patent No.: US 8,213,869 B2
(45) Date of Patent: Jul. 3, 2012

(54) INTERFERENCE FILTRATION DEVICE ADAPTED TO A SENSOR SENSITIVE TO ELECTROMAGNETIC WAVES AND RELATED FILTRATION METHOD

(75) Inventors: Bertrand Vaysse, Tournefeuille (FR); Karim Ben Dhia, Colomiers (FR); Frederic Cantie, Toulouse (FR); Benoit Depont, Muret (FR); Xavier Hourne, Cugnaux (FR)

(73) Assignee: Continental Automotive France, Toulouse (FR)

( * ) Notice: Subject to any disclaimer, the term of this patent is extended or adjusted under 35 U.S.C. 154(b) by 411 days.

(21) Appl. No.: 12/596,049

(22) PCT Filed: Apr. 8, 2008

(86) PCT No.: PCT/EP2008/002760
§ 371 (c)(1),
(2), (4) Date: Oct. 15, 2009

(87) PCT Pub. No.: WO2008/141698
PCT Pub. Date: Nov. 27, 2008

(65) Prior Publication Data
US 2010/0117760 A1 May 13, 2010

(30) Foreign Application Priority Data
Apr. 20, 2007 (FR) .................. 07 02877

(51) Int. Cl.
*H04B 1/00* (2006.01)
(52) U.S. Cl. .......... 455/63.1; 455/501
(58) Field of Classification Search .......... 455/63.1, 455/63.4, 501, 504; 333/12, 165
See application file for complete search history.

(56) References Cited

U.S. PATENT DOCUMENTS
2002/0093418 A1* 7/2002 Schmitz et al. .............. 340/5.62

FOREIGN PATENT DOCUMENTS
| EP | 1 158 122 | | 11/2001 |
| EP | 1158122 | * | 11/2001 |
| FR | 2 827 064 | | 1/2003 |
| FR | 2827064 A1 | * | 1/2003 |

OTHER PUBLICATIONS
International Search Report dated Jul. 1, 2008, from corresponding PCT application.

* cited by examiner

Primary Examiner — Nay A Maung
Assistant Examiner — Angelica Perez
(74) Attorney, Agent, or Firm — Young & Thompson

(57) ABSTRACT

A method and device for filtering electromagnetic interference generated by the antenna of a transmitter on a sensor sensitive to electromagnetic waves, characterized in that it includes:
vi. elements suitable for sampling the signal received by the sensor,
vii. elements for count down the elapsed time, called the detection time, after the sampled signal has exceeded a threshold value, the signal, before exceeding the threshold value, being in a range of standard values,
viii. elements for comparing in real time the detection time with a threshold time value,
ix. elements suitable for providing a diagnosis of electromagnetic interference to be filtered if the sampled signal reverts to a standard value after a detection time of less than the threshold time value, and a diagnosis of an uninterfered sampled signal if this is not the case,
x. elements for generating an output signal from the sensor eliminating the diagnosed electromagnetic interference.

9 Claims, 2 Drawing Sheets

Figure 1A:
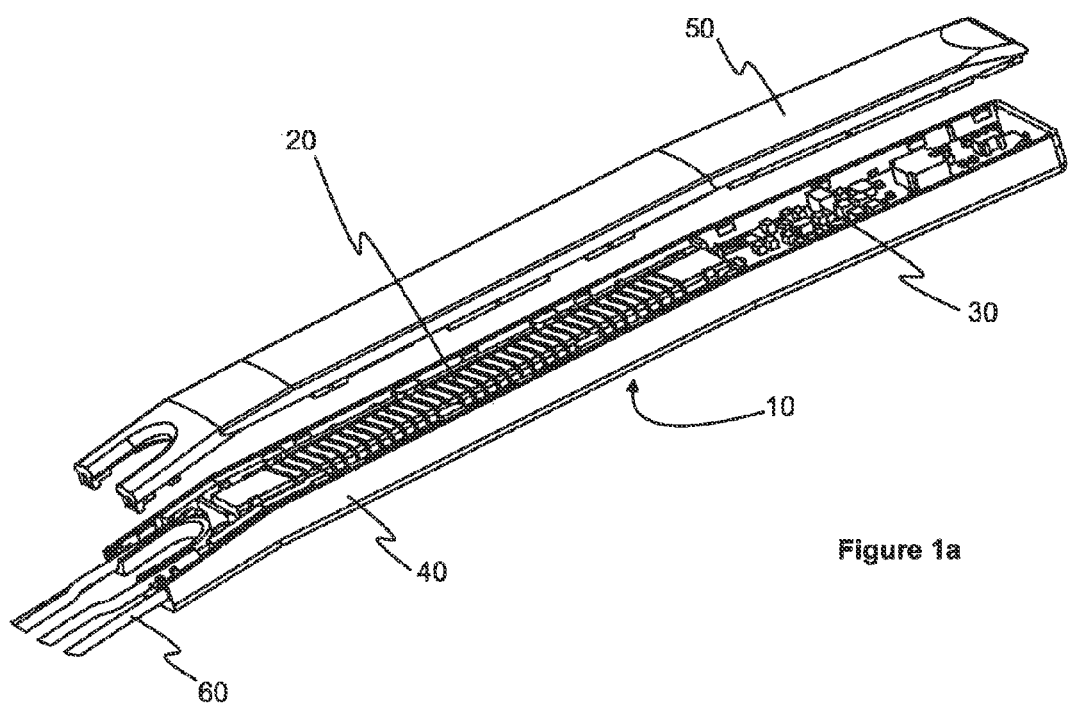

INTERFERENCE FILTRATION DEVICE ADAPTED TO A SENSOR SENSITIVE TO ELECTROMAGNETIC WAVES AND RELATED FILTRATION METHOD

The present invention relates to a device for filtering electromagnetic interference.

More precisely, it applies to the sensors that are sensitive to electromagnetic interference (a Hall effect sensor or proximity capacitive sensor for example) placed in an environment in which known interference is present.

As an illustration, in no way limiting per se, the present invention will be explained in the motor vehicle field and more specifically in the access control to a motor vehicle of the "handsfree" type.

Currently, the generic principle of operation of "handsfree" vehicle access is as follows:

the vehicle is fitted with means (a computer dedicated totally or partially to this function) for identifying the approach of authorized persons (usually carriers of an electronic badge capable of communicating in a secure manner with the identification means via a low-frequency wave, for example of the order of 125 kHz). Regular and frequent polling is carried out (for example every 250 ms) in order to determine whether the badge of an authorized person is in the immediate vicinity of the vehicle.

When an authorized person approaches, the identification means nevertheless wait for said person to really exhibit the intention to enter (hence the presence of a proximity sensor in the device), before unlocking the opening element(s) of the vehicle. The purpose of this double verification is to allow—for example—an authorized person to pass close to his vehicle without nevertheless systematically unlocking access thereto or else unlocking only one opening element.

In this device, one of the means that can be used to determine the real intention of the authorized person to enter the vehicle consists in placing, in the handle of the opening elements, a proximity sensor which will allow the identification means to be informed (when the authorized person holds his hand out toward the handle of the opening element). Such a type of sensor is for example of the capacitive type and then sends a proximity detection signal to the identification means. If the double condition specified above is satisfied (detection of authorization in the form of a badge and detection of a part of the body—usually a hand—close to the handle of the opening element), then unlocking takes place and access is authorized, very often accompanied by a "welcome signal" such as the switching on of the interior light of the vehicle for example.

In this situation, the capacitive sensor is incorporated into the handle, just like the low-frequency antenna intended to transmit to the badge of the authorized person. These two entities (proximity sensor and transmitting antenna) therefore cohabit in an immediate vicinity without being connected together, the only common point being that both the proximity sensor and the antenna are connected to the identification means.

Capacitive proximity sensors however have the recognized drawback of being interfered with during the transmission phases of the low-frequency antennas. This is also able to be generally applied to other types of sensors sensitive to electromagnetic signals, such as Hall effect sensors for example. This interference, if not eliminated, may lead to errors in detection and generate, for example, the unwarranted unlocking of the opening elements of the vehicle although the authorized person does not intend to enter. In addition, this interference may occur at the very moment when the authorized person wishes to enter the vehicle (hand in contact with the handle) and prevent the smooth operation of unlocking the opening element, giving the user the impression of a faulty system.

A first solution that can be envisaged consists in providing the proximity sensor with the information according to which the antenna is in transmission mode and interference is likely to occur. This may be done by the identification means. The sensor can then itself filter the expected interference. The main disadvantage of this is that it requires two-way communication between the sensor and the identification means and it causes added expenditure in terms of connections (addition of an extra wire—and the risks of failures associated with this addition—or specific two-way configuration of the interchange protocol between the sensor and the identification means).

An alternative solution consists in not having the sensor switched on during the transmission phases. This solution, which is pragmatic at first sight—since the identification means can very well control the power supply of the sensor without having to use an added connection or else a two-way interchange protocol—has a certain handicap. Specifically, when the sensor is switched on again, it is not immediately operational (many sensors pass through an initialization and/or calibration phase on startup) and the delay becomes incompatible with the speed of detection that is sought. The time during which the sensor is inactive (time switched off plus startup time) frequently causes a hand then taking hold of the opening element handle to be undetected. The user is then faced with what is called a "wall effect" (the hand pulls the opening element but nothing happens) and he has to pull the handle several times before the detection means is informed of his intention. This is therefore not an acceptable solution.

A third way consists in the sensor itself controlling the transmissions of the antenna. It is then necessarily informed of the interference to come. This solution is not acceptable either because it ties independent components together and it adds to the interference radiated during the transmission the electromagnetic interference conducted by the added electrical connection.

The object of the present invention is to remedy the foregoing problems and to do so at a contained cost.

Accordingly, the subject of the invention is initially a device for filtering electromagnetic interference generated by the antenna of a transmitter on a sensor sensitive to electromagnetic waves, the device being noteworthy in that it comprises in particular:

i. means suitable for sampling the signal received by the sensor,
ii. means making it possible to count down the elapsed time, called the detection time, after the sampled signal has exceeded a threshold value, said signal, before exceeding the threshold value, being in a range of standard values,
iii. means making it possible to compare in real time the detection time with a threshold time value,
iv. means suitable for providing a diagnosis of electromagnetic interference to be filtered if the sampled signal reverts to a standard value after a detection time of less than the threshold time value, and a diagnosis of an uninterfered sampled signal if this is not the case,
v. means for generating an output signal from the sensor eliminating the diagnosed electromagnetic interference.

Advantageously, the antenna is placed in the immediate vicinity of the sensor in order to reduce the general bulk of the assembly.

According to one embodiment, the filtering device is incorporated into the sensor, this making it possible to relieve any other electronic computer of this workload.

In a particular embodiment, the antenna and the sensor are incorporated into a handle of a motor vehicle opening element.

Subsidiarily, the sensor used may be of the capacitive or Hall effect type.

The invention also relates to a device for controlling access aboard a motor vehicle incorporating a device for filtering electromagnetic interference described in the present document.

Finally, the invention also covers a method for filtering electromagnetic interference generated by the antenna of a transmitter on a sensor sensitive to electromagnetic waves, comprising in particular the following steps:

i. sampling of the signal received by the sensor,
ii. measurement of the elapsed time, called the detection time, after the sampled signal has exceeded a threshold value, said signal, before the threshold value has been exceeded, being in a range of standard values,
iii. comparison, in real time, of the elapsed time with a threshold time value,
iv. establishment of a diagnosis of electromagnetic interference to be filtered if the sampled signal reverts to a standard value after a detection time of less than the threshold time value, diagnosis of an uninterfered sampled signal if this is not the case,
v. transmission of an output signal from the sensor eliminating the diagnosed electromagnetic interference.

Figure 1B:
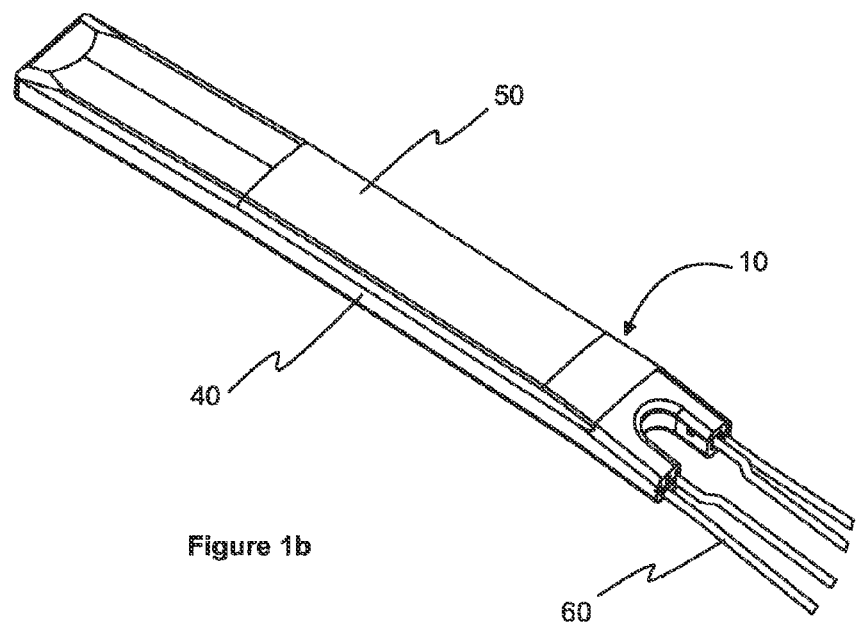
Figure 2:
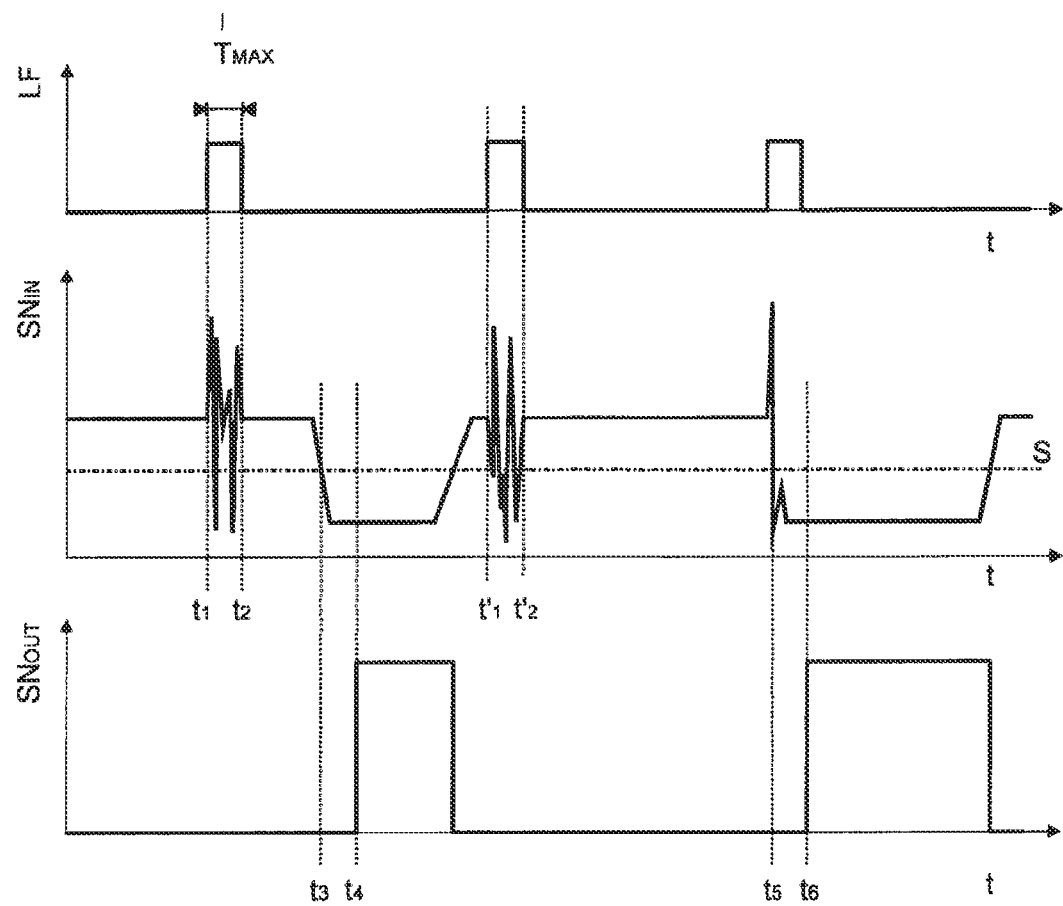

Other features, objects and advantages of the invention will emerge from the following detailed description with reference to the appended drawings which represent thereof, as an example, a preferred embodiment. In these drawings:

FIG. 1a is a view in perspective of a module (partially assembled) incorporating a proximity sensor and an antenna which are associated with a device according to the invention, FIG. 1b is a view in perspective of the same assembled module, FIG. 2 is a diagram showing the operating principle of the invention.

The module 10 shown in FIGS. 1a and 1b consists of a bottom casing 40 and a top casing 50 in the embodiment shown. This module contains the antenna 20 and the electronics of the proximity sensor 30 positioned one beside the other. In order to supply power to the above two elements and ensure that they communicate with the identification means (not shown), electric wires 60 protrude from the module 10.

FIG. 2 illustrates the operating principle of a device according to the invention.

The top curve shows the LF transmission phases of the antenna 20 for the time t. To give an order of magnitude, the antenna 20 is in transmission mode for approximately 30 ms every 250 ms. These values are usually determined for each type of configuration and so the value $T_{MAX}$ of the transmission time of the antenna 20 is known and immutable for a given type of vehicle.

The interference induced on the proximity sensor 30 can be seen on the middle curve showing the signal $SN_{IN}$ detected and sampled at the input of the proximity sensor for the time t. In the embodiment shown in FIG. 2, the values above the threshold S are representative of the absence of a person in the vicinity of the sensor 30. These values are called "standard values" as opposed to the values below the threshold S which for their part are representative of the presence of a person. It appears that, during the transmission phases of the antenna 20, random and considerable interference occurs. This interference may cause the signal $SN_{IN}$ to exceed the threshold S (cf. between $t_1$ and $t_2$ or between $t'_1$ and $t'_2$). In practice, between the moments $t_1$ and $t_2$ or between $t'_1$ and $t'_2$, it is impossible to envisage detecting anything.

If the signal $SN_{IN}$ is not filtered between $t_1$ and $t_2$ or between $t'_1$ and $t'_2$, the proximity sensor 30 risks signaling the presence—and to do so incorrectly—of a person in the vicinity of said sensor 30.

From the moment $t_3$, the presence of a real person (authorized or not) is detected. The signal $SN_{IN}$ exceeds the threshold value S and the proximity sensor must then inform the detection means because in this case it is really a detection.

The invention therefore proposes to proceed as follows. For a given "antenna/sensor" binomial, the duration $T_{MAX}$ of the interference (and optionally its frequency of occurrence over time) are known (30 ms of transmission every 250 ms in the example cited above). It is then possible for the sensor 30 to take no account of an input signal below the threshold value S unless it lasts more than the threshold time value $T_{MAX}$. To do this, the sensor measures the elapsed time, called the detection time, after the threshold S has been exceeded. If the detection time is less than the threshold time value $T_{MAX}$ (as is the case with the interference between $t_1$ and $t_2$ or between $t'_1$ and $t'_2$, for example), then an electromagnetic interference is diagnosed. If the detection time is greater than the threshold time value $T_{MAX}$, then a proximity detection may be diagnosed.

Therefore the output signal $SN_{OUT}$ from the proximity sensor can be filtered so as to obtain the bottom curve in FIG. 2, cleared of the interference and representing the signal delivered by the sensor 30 for the time t. It appears that between $t_1$ and $t_2$ or between $t'_1$ and $t'_2$ the interference is removed.

The proximity of a person is not signaled immediately (the situation at $t_3$), but with a certain systematic time lag inherent in the principle of the invention, equivalent to the threshold time value $T_{MAX}$. In this instance, $t_4$—the moment at which the proximity detection is diagnosed—is such that $t_4=t_3+T_{MAX}$. The consequence of this is to slightly slow down the real detection, nevertheless without this becoming a reason for failure. As an illustration, the acceptable time lag between the moment at which the handle is touched and that at which the starting of the electric motors commands the unlocking of the lock of the opening element must be less than 150 ms so that the authorized person desiring to enter the vehicle does not perceive any delay on opening. The time lag induced by the threshold time value $T_{MAX}$ (30 ms in our example) is therefore totally acceptable and makes it possible to react in less than 140 ms.

As is understood on reading the description of the invention, the systematic time lag is much shorter than the time during which the hand is in contact with the handle (which may last several seconds compared with the 30 ms of the example). It is therefore not possible to fail to detect a real proximity.

The situation illustrated from $t_5$ is illustrative of this situation; the interference generated by the antenna 20 begins slightly before the hand comes into contact with the handle and activates the proximity sensor 30. The result of this is that, between $t_5$ and $t_6$—although the signal $SN_{IN}$ is below the threshold value S—detection is made impossible because of the filtering applied by the sensor 30. The real detection of proximity is possible only from $t_6$. As explained above, the proximity detection is deferred in reality, nevertheless without ever exceeding the value of the threshold time value $T_{MAX}$.

The invention fully satisfies the required technical demands, and does so at a contained cost since there is no added connection or dialog between the components. The invention makes it possible for no incorrect detection message to be sent to the detection means and thereby ensures access security via the filtering of the interference.

The present invention should not be limited to the only embodiment described, but covers any adaptation within the scope of those skilled in the art.

It is for example totally possible to envisage that the signal $SN_{OUT}$ transmitted by the sensor to the identification means is not linked to the detection time but simply consists of pulses of fixed duration.

Moreover, the sensor may anticipate the interference if it knows how frequently the antenna 20 transmits.

Finally, the present invention is described with a low-frequency wave transmitter, but any other frequency range generating the same interference on a sensor could be used and find a solution through the invention.

The invention claimed is:

1. A device for filtering electromagnetic interference generated by an antenna (20) of a transmitter on a sensor (30) sensitive to electromagnetic waves, characterized in that it comprises in particular:
   i. means suitable for sampling an signal ($SN_{IN}$) received by the sensor (30),
   ii. means making it possible to count down an elapsed time, called the detection time, after a sampled signal has exceeded a threshold value (S), said signal, before exceeding the threshold value (S), being in a range of standard values,
   iii. means making it possible to compare in real time a detection time with a threshold time value ($T_{MAX}$),
   iv. means suitable for providing a diagnosis of electromagnetic interference to be filtered if the sampled signal reverts to a standard value after a detection time of less than the threshold time value ($T_{MAX}$), and a diagnosis of an uninterfered sampled signal if this is not the case,
   v. means for generating an output signal ($SN_{OUT}$) from the sensor eliminating the diagnosed electromagnetic interference.

2. The filtering device as claimed in claim 1, characterized in that the antenna (20) is placed in the immediate vicinity of the sensor (30).

3. The filtering device as claimed in claim 1, characterized in that the filtering device is incorporated into the sensor (30).

4. The filtering device as claimed in claim 3, characterized in that the antenna (20) and the sensor (30) are incorporated into a handle of a motor vehicle opening element.

5. The filtering device as claimed in claim 1, characterized in that the sensor (30) is of the capacitive type.

6. The filtering device as claimed in claim 1, characterized in that the sensor (30) is of the Hall effect type.

7. The filtering device as claimed in claim 1, characterized in that the transmitter operates at low frequencies.

8. A device for controlling access aboard a motor vehicle, characterized in that it incorporates a device for filtering electromagnetic interference as claimed in claim 1.

9. A method for filtering electromagnetic interference generated by an antenna (20) of a transmitter on a sensor (30) sensitive to electromagnetic waves, comprising in particular the following steps:
   i. sampling of a signal ($SN_{IN}$) received by the sensor (30),
   ii. measurement of elapsed time, called the detection time, after a sampled signal has exceeded a threshold value (S), said signal, before the threshold value (S) has been exceeded, being in a range of standard values,
   iii. comparison, in real time, of the elapsed time with a threshold time value ($T_{MAX}$),
   iv. establishment of a diagnosis of electromagnetic interference to be filtered if the sampled signal reverts to a standard value after a detection time of less than the threshold time value ($T_{MAX}$), diagnosis of an uninterfered sampled signal if this is not the case,
   v. transmission of an output signal ($SN_{OUT}$) from the sensor (30) eliminating the diagnosed electromagnetic interference.

* * * * *